C. A. SUNDT.
METHOD FOR DETERMINING RELATIVE SPEED OF MOVING BODIES.
APPLICATION FILED MAR. 23, 1918.
1,299,058.
Patented Apr. 1, 1919
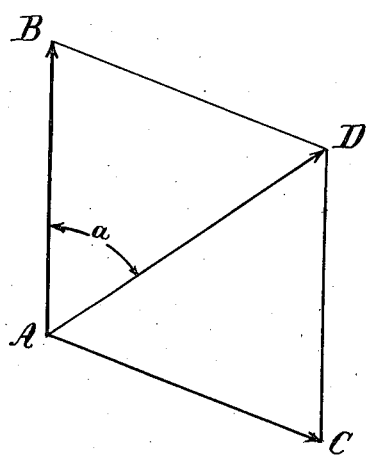
Fig. 1.
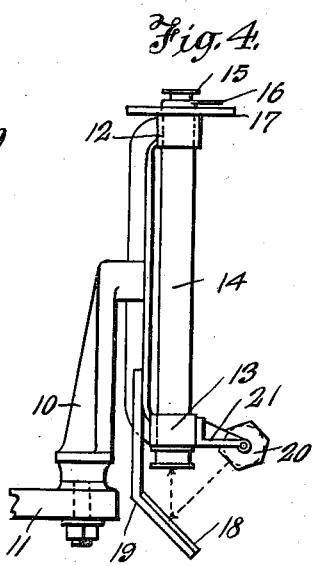
Fig. 4.
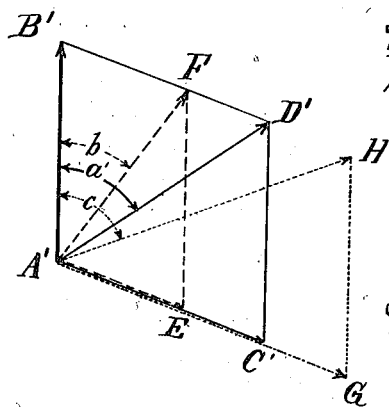
Fig. 2.
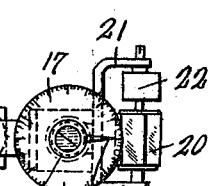
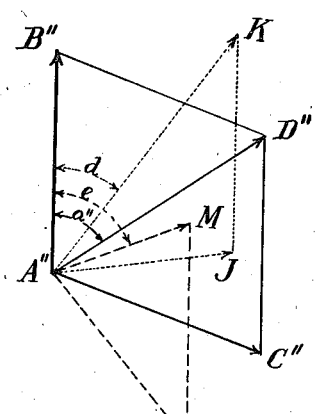
Fig. 3.
Fig. 5.
Inventor
Carlos A. Sundt
By his Attorneys
Pennie, Davis, Marvin & Edmonds

UNITED STATES PATENT OFFICE.

CARLOS A. SUNDT, OF SANTIAGO, CHILE.

METHOD FOR DETERMINING RELATIVE SPEED OF MOVING BODIES.

1,299,058. Specification of Letters Patent. Patented Apr. 1, 1919.

Application filed March 23, 1918. Serial No. 224,156.

*To all whom it may concern:*

Be it known that I, CARLOS A. SUNDT, a citizen of the Republic of Chile, residing at Santiago, Chile, have invented certain new and useful Improvements in Methods for Determining Relative Speed of Moving Bodies; and I do hereby declare the following to be a full, clear, and exact description of the invention, such as will enable others skilled in the art to which it appertains to make and use the same.

The present invention which involves a method for determining the relative speed of two bodies is of general utility in those cases where an observer on one of the bodies may observe the stream line effect produced by the relative motion of the bodies, and from this stream line effect taken in connection with a stream line effect that is produced artificially may determine the relative speed of the bodies. While the method is applicable to a wide variety of cases, I have selected for purpose of illustration its application to aerial navigation and particularly the determination, from observations made from an air craft, of the actual speed of the craft with respect to the ground, or the "ground speed" as it is usually called.

The usual methods of determinating the actual speed of an air craft with relation to the ground depend upon observations of a fixed point on the ground, the point being kept in view through a telescope for a certain length of time, and the angular change necessary to follow the object as the air craft moves along being measured. As a result of these observations, the angular speed of the craft with relation to the earth is known, and in order to determine its actual speed, it is necessary to know the altitude at which the craft is flying. This can be determined by the usual instruments, and from the observations thus made, the actual speed corresponding to the angular speed at the given altitude may be determined. Various kinds of apparatus of more or less complexity have been proposed, or are in use for making the above observations and obtaining the results therefrom, but in whichever way the method is practised, it is necessary to keep in view for a certain length of time a definite object or point upon the ground. The usual methods have then the disadvantage that they can not be used at sea, unless there is some fixed object which can be viewed. Neither can they be used on land, if objects are not clearly visible, or in flying over country in which no distinguishable objects can be seen.

Since an air craft is subject to various irregularities in its travel, such as rolling or acceleration, it is necessary to provide as a part of an instrument for determining the angular speed of the craft a level which is intended to enable one to correct for errors due to the causes mentioned above, but the level itself is also subject to momentary or accidental errors due to rolling or acceleration of the craft so that it cannot always be depended upon, particularly where a high degree of accuracy is required.

If instead of being obliged to keep his instrument fixed upon a definite object the observer need only observe the passage of all objects through the field of a telescope, on the same principle that one observes the stream lines in connection with the well known drift indicator the disadvantages of the usual methods will be overcome, and observations can be made more conveniently and accurately. The method of the present invention makes use of the stream line effect produced by the passage of objects through the field of vision of an instrument carried by the air craft. By eliminating the necessity for observing a definite object upon the surface of the earth, the method is adapted for flying over any kind of land, or even over the water, for as a rule there will be sufficient wave crests on the surface of the water to give the stream line effect. The stream line method of observation has the further advantage that it eliminates minor errors such as those due to the difficulty of keeping the instrument accurately fixed upon a definite object or the momentary or accidental errors produced in the levels of the air craft by rolling or acceleration of the latter. Objects on the ground merge in the general stream line effect and their general direction of movement through the field of the telescope may be accurately determined. The observations can therefore be made more conveniently and accurately than with the methods at present in use.

The particular nature of the invention, as well as other objects and advantages thereof, will appear more clearly from a description of certain ways in which it may be carried out in practice, and in connection with this description, reference should be made to the accompanying drawing in which each of Figs. 1, 2 and 3 shows in diagrammatic manner an application of the method, and Figs. 4 and 5 show in side elevation and plan, respectively, an instrument for use in practising the method.

In order to practise the method of the present invention, the air craft is provided with an instrument adapted to oscillate at a constant speed to produce what may be termed an artificial stream line effect, as distinguished from the stream line effect due to the forward travel of the air craft. Various types of instruments may be adapted for this pupose, such as a telescope provided with a prism or mirror which may be rotated by clock mechanism to cause the image of the ground to travel through the field of the telescope and thus produce a stream line effect.

Figs. 4 and 5 show the general construction of an instrument of this type, although it will be understood that other types of instruments may be used to produce the artificial stream line effect required for the method of the present invention. This instrument comprises a vertical standard 10 rotatably mounted upon a base 11 which may be attached to any point of an aircraft convenient to the observer. The standard is formed with two brackets 12 and 13, within which is rotatably mounted a telescope 14 having an eye-piece 15 with cross hairs and an index 16 adapted to move over a fixed scale 17 mounted on top of the other bracket. Beneath the object glass of the telescope is plane mirror 18 mounted upon a support 19 attached to bracket 13. A rotary mirror 20 is mounted between arms 21 attached to bracket 13, and this mirror may be driven at a constant speed by clockwork 22. It will be understood that the clockwork is provided with suitable means for controlling the speed at which it drives the mirror. As here shown, the mirror 20 is provided with six faces, but it will be understood that any other number may be used.

If the mirror 20 is at rest, with one of the faces occupying the position shown in Fig. 4, the ground directly beneath the instrument may be observed owing to the reflection of light from the face of the mirror 20 and the mirror 18 into the telescope. If the aircraft is in motion, objects upon the ground will appear to travel through the field of view of the telescope, thus producing a stream line effect. By turning the telescope until its cross hairs coincide with the direction of the stream lines, the angular relation of the latter to the zero point of the scale 17 may be determined.

If mirror 20 is rotated at a constant speed by the clockwork, the effect in the telescope will be that of an apparent movement of the ground across the field of view of the telescope, producing an artificial stream line effect, as distinguished by the real stream line effect produced by the forward travel of the aircraft. The angular relation of the artificial stream lines may be determined by the cross hairs and pointer of the scale as in the case of the real stream lines.

Referring to the application of the method illustrated diagrammatically in Fig. 1, the line A B represents in direction the actual course of the aircraft with respect to the ground. This may be determined by the instrument described above or by a drift indicator in accordance with the usual practice and corresponds to the direction of the real stream lines as observed with such an instrument and caused by the forward travel of the craft and the resultant effect of wind on the craft. In this application of the method, it is intended that the movable mirror of the instrument shall be rotated at a constant speed, and the entire instrument shall occupy a fixed relation with respect to the actual course of the craft, this fixed relation being determined by the position of the instrument with respect to the base 11 upon which it is mounted, and with respect to which its position may be changed. The line A C represents the direction of movement of the ground with respect to the actual course of the aircraft when the ground is viewed through the instrument with the mirror 20 in rotation. Otherwise explained, this line represents the direction corresponding to that of the artificial stream line effect which would be produced by the moving instrument if the aircraft were not in motion and the earth were viewed through the instrument. The length of the line A C is laid off in proportion to the angular speed of the moving mirror of the instrument and to the altitude of the machine. If now, the aircraft is in flight, and the mirror of the instrument is rotating, the observed or apparent stream lines will have a direction depending upon three factors: (1) the angle between the direction of the artificial stream lines and the direction of the aircraft itself; (2) the ground speed of the aircraft, and (3) the angular speed of the mirror of the instrument multiplied by the altitude of the aircraft. Since in the application of Fig. 1 the angular speed of the mirror of the instrument is constant, the third factor will vary only with the altitude. In the diagram the direction of the resultant or apparent stream lines is given by the line A D which makes an angle $a$ with the line A D, representing the actual course of the aircraft, or the direction of the real stream lines. Knowing this angle, and considering the line A C as proportional to the product of the angular speed of the instrument and the altitude of the craft, the length of the line A D may be obtained, and this line will represent the actual speed of the aircraft with respect to the ground as measured in units of the system employed for the other quantities.

In the application of the method as shown in Fig. 2, it is intended that the mirror of the instrument shall be rotated at different speeds, but the entire instrument bears a fixed relation to the course of the aircraft, so that the angle between the lines A' B' and A' C' remains constant, but the speed of rotation of the mirror of the instrument is changed until the observed stream lines, as represented by the diagonal of the parallelogram, are at a predetermined angle, such as $a'$ with respect to the line A' B'. The first observation may be made with a speed proportional to the line A' E which gives a resultant A' F having an angle $b$ with the line A' B'. This angle is less than the predetermined angle $a'$ so that the speed of the mirror should be increased, and it may be considered that it is now increased in proportion to the line A' G. This would give a resultant A' H which would lie at an angle $c$ with respect to the line A' B'. The speed of the mirror is then reduced and finally adjusted to the value which will show the apparent stream lines moving through the field of view of the telescope at the angle $a'$, and the resultant is then the line A' D' which is as before, the diagonal of the parallelogram of which the side A' B' will represent in magnitude the actual speed of the aircraft with respect to the earth.

In the application of the method as shown in Fig. 3, it is intended that the mirror of the instrument shall be rotated at constant speed, but the angular relation of the entire instrument with respect to the course of the aircraft may be changed by turning the vertical standard 10 about the pivot by which it is fastened to base 11, to cause the apparent stream lines to lie at a predetermined angle $a''$ with respect to the line A'' B'' representing the actual course of the craft. In this case, the lines representing the artificial stream line effect produced by the moving mirror of the instrument will all be of the same length, provided the altitude remains constant, but will subtend different angles with respect to the line A'' B''. In making observations according to this method, it may be assumed that the instrument is given such a direction as represented by A'' J as will cause the resultant A'' K to subtend an angle $d$ with respect to the line A'' B''. This angle is less than the predetermined angle $a''$ so that it is necessary to change the direction of the instrument, say to the direction A'' L, and the resultant with this change of direction is the line A'' M which subtends an angle $e$ with respect to the line A'' B''. Since this is more than the predetermined angle $a''$, the instrument is then moved to a direction lying between the previous directions, and this direction may be designated by the line A'' C'', and the length of this line is proportional to the speed with which the mirror of the instrument moves and the altitude of the craft as explained in connection with the line A C of Fig. 1. The resultant A'' D'' will then be found to lie at the angle $a''$ with respect to the actual direction of the craft. In other words, the apparent stream lines will pass through the field of the instrument at the predetermined angle $a''$ with respect to the actual direction of the craft, or the direction of the real stream lines as represented by the line A'' B''. By completing the parallelogram, the length of the line A'' B'' is finally obtained and this represents in magnitude the actual speed of the craft with respect to the earth in terms of the units in which the measurements are being made.

While three applications of the method of the present invention to aerial navigation have been explained, it will be understood that other applications of the method may be made without departing from the principle thereof. This method may also be used for determining the speed of any body when observed from a known distance. For instance the method is adapted to be used for determining the speed of clouds, by obtaining the resultant of the stream line effect produced by motion of the clouds and that produced by an instrument moving at constant speed in a direction other than that in which the clouds are moving.

The instrument shown in Figs. 4 and 5 could be used for this purpose by inverting it and viewing the clouds by the telescope and mirrors, at the same time producing the artificial stream line effect by rotating the mirror 20.

I claim:

1. The herein described method for determining the relative speed of two bodies which consists in determining the angular relation between the real stream lines produced only by the motion of one of the bodies relative to the other and the apparent stream lines resulting from a combination of the said real stream lines and artificial stream lines produced by an instrument mounted on one of the bodies and adapted to move in a predetermined direction at a predetermined speed, and from the angular relation between the real and apparent stream lines, and the direction and speed of said artificial stream lines determining the relative speed of the bodies.

2. The herein described method for determining the relative speed of two bodies which consists in determining the angular relation between the real stream lines produced only by the motion of one of the bodies relative to the other and the apparent stream lines resulting from a combination of the said real stream lines and artificial stream lines produced by an instrument mounted on one of the bodies and adapted to move in a predetermined direction at a predetermined speed, and from the angular relation between the real and apparent stream lines, and the direction and speed of said artificial stream lines forming a parallelogram of velocities showing the relative speed of the bodies.

3. The herein described method for determining the relative speed of two bodies which consists in determining the angular relation between the real stream lines produced only by the motion of one of the bodies relative to the other and the apparent stream lines resulting from a combination of the said real stream lines and artificial stream lines produced by an instrument mounted on one of the bodies and adapted to move in a predetermined direction at a predetermined speed and from the angular relation between the real and apparent stream lines and the direction and known speed of movement of such instrument, and the distance separating the bodies, forming a parallelogram of velocities showing the relative speed of the bodies.

4. The herein described method of determining the relative speed of two bodies which consists in determining the angular relation between the real stream lines produced only by the motion of one of the bodies relative to the other and the apparent stream lines resulting from a combination of the said real stream lines and artificial stream lines produced in the field of a telescope mounted on one of the bodies, by means of a member associated with said telescope and adapted to move in a predetermined direction at a predetermined speed, and from the angular relation between the real and apparent stream lines, and the direction and speed of said artificial stream lines determining the relative speed of the bodies.

In testimony whereof I affix my signature.

CARLOS A. SUNDT.